(12) United States Patent
Kim et al.

(10) Patent No.: US 11,240,016 B2
(45) Date of Patent: Feb. 1, 2022

(54) METHOD AND APPARATUS FOR STABILIZING QUANTUM CRYPTOGRAPHIC KEY DISTRIBUTION

(71) Applicant: ID QUANTIQUE S.A, Carouge (CH)

(72) Inventors: Jang Myun Kim, Seoul (KR); Jeong Sik Cho, Seoul (KR)

(73) Assignee: ID QUANTIQUE S.A, Carouge (CH)

( * ) Notice: Subject to any disclaimer, the term of this patent is extended or adjusted under 35 U.S.C. 154(b) by 254 days.

(21) Appl. No.: 16/492,232

(22) PCT Filed: Dec. 15, 2017

(86) PCT No.: PCT/KR2017/014864
§ 371 (c)(1),
(2) Date: Sep. 9, 2019

(87) PCT Pub. No.: WO2018/164356
PCT Pub. Date: Sep. 13, 2018

(65) Prior Publication Data
US 2020/0044836 A1    Feb. 6, 2020

(30) Foreign Application Priority Data

Mar. 7, 2017 (KR) .................. 10-2017-0028795
Mar. 7, 2017 (KR) .................. 10-2017-0104173

(51) Int. Cl.
*H04L 9/08* (2006.01)
*H04L 9/12* (2006.01)

(52) U.S. Cl.
CPC .............. *H04L 9/0858* (2013.01); *H04L 9/12* (2013.01)

(58) Field of Classification Search
CPC ........ H04L 9/0852; H04L 9/0858; H04L 9/12
See application file for complete search history.

(56) References Cited

U.S. PATENT DOCUMENTS 7,627,126 B1 * 12/2009 Pikalo .................. H04L 9/0858
356/473
2007/0110241 A1 * 5/2007 Trifonov ............... H04L 9/0852
380/255

(Continued)

FOREIGN PATENT DOCUMENTS

CN    102113268 A    6/2011
CN    105337730 A    2/2016

(Continued)

OTHER PUBLICATIONS

Yu Yang Ding et al. (Yu) Polarization basis tracking scheme for quantum key distribution with revealed sifted key bits, published Aug. 2, 2016, (Year: 2016).*

(Continued)

*Primary Examiner* — Vu V Tran
(74) *Attorney, Agent, or Firm* — Hauptman Ham, LLP

(57) ABSTRACT

The present disclosure in some embodiments provides a method and an apparatus for providing a quantum cryptographic key distribution stabilization, which can quickly and efficiently compensate for an error caused by a temperature change, a change in polarization of a transmission path of an optical system included in a quantum cryptographic key distribution system in a cost-effective manner working perfectly with the very conventional quantum cryptographic key distribution system.

13 Claims, 10 Drawing Sheets

(56) References Cited

U.S. PATENT DOCUMENTS

| | | | |
|---|---|---|---|
| 2009/0185689 A1* | 7/2009 | Beal | H04L 9/0858 380/278 |
| 2011/0075839 A1 | 3/2011 | Noh | |
| 2011/0150226 A1 | 6/2011 | Cho | |
| 2011/0150504 A1* | 6/2011 | Ellis | H04B 10/60 398/203 |
| 2012/0328290 A1* | 12/2012 | Yuan | H04B 10/70 398/48 |
| 2016/0234018 A1* | 8/2016 | Frohlich | H04L 9/0852 |
| 2016/0373117 A1* | 12/2016 | Josefsberg | H03L 7/24 |

FOREIGN PATENT DOCUMENTS

| | | |
|---|---|---|
| JP | 9-96845 A | 4/1997 |
| JP | 200720138 A | 1/2007 |
| JP | 2011-188043 A | 9/2011 |
| JP | 2014-147068 A | 8/2014 |
| JP | 2016144206 A | 8/2016 |
| KR | 10-2006-0113767 A | 11/2006 |
| KR | 10-2009-0124679 A | 12/2009 |
| KR | 10-0983008 B1 | 9/2010 |
| KR | 10-2011-0071803 A | 6/2011 |
| KR | 10-2016-0050934 A | 5/2016 |
| KR | 10-1672497 B1 | 11/2016 |

OTHER PUBLICATIONS

Polarization Basis Tracking Scheme for Quantum Key Distribution with Revealed Sifted Key Bits, published Aug. 2, 2016 to Yu et al. (Year: 2016).*

International Search Report dated May 29, 2018, in connection with counterpart International Patent Application No. PCT/2017/014864.

Chinese Office Action dated May 7, 2021 for corresponding Chinese Patent Application No. 201780088168.4 with English Translation.

Junbin et al., "Uninterrupted active phase compensation scheme for BB84 phase encoding quantum key distribution system", High Pwer Laser and Particle Beams, Aug. 2011, pp. 2215-2219, vol. 23, No. 8, with English Abstract, cited in NPL No. 1.

Yu-Yang Ding et al., "Polarization basis tracking scheme for quantum key distribution with revealed sifted key bits", arxiv. org, Cornell University Library, Aug. 1, 2016, XP080717462, 201 Olin Library Cornell University Ithaca, NY 14853, cited in NPL No. 2.

The extended European Search Report dated Nov. 23, 2020 in connection with the counterpart European Patent Application No. 17899245.9.

Japanese Office Action dated Nov. 24, 2020 in connection with the counterpart Japanese Patent Application No. 2019-548671, with English Machine Translation.

* cited by examiner

METHOD AND APPARATUS FOR STABILIZING QUANTUM CRYPTOGRAPHIC KEY DISTRIBUTION

This present application is a national stage filing under 35 U.S.C. § 371 of PCT application number PCT/KR20171014864 filed on Dec. 15, 2017 which is based upon and claims the benefit of priority to Korean Patent Application No. 10-2017-0028795 filed on Mar. 7, 2017, and Korean Patent Application No. 10-2017-0104173, filed on Mar. 7, 2017 in the Korean Intellectual Property Office. The disclosures of the above-listed applications are hereby incorporated by reference herein in their entirety.

FIELD OF INVENTION

The present disclosure in some embodiments relates to a method and an apparatus for stabilizing quantum cryptographic key distribution.

BACKGROUND OF INVENTION

The statements in this section merely provide background information related to the present disclosure and do not necessarily constitute prior art.

Most cryptosystems in use today are usually based on mathematical complexity and are reversible, and so destined to succumb to problem-solving. One solution to this issue is quantum cryptography, more precisely quantum key distribution.

While most existing cryptosystems are principally based on mathematical complexity, quantum cryptography is based on natural phenomena and is one of the ideal ways to generate one-time cryptographic keys for cryptography. When the eavesdropper (Eve) intercepts in the middle, its existence is revealed, and the signal is distorted, which provides security that even the eavesdropper cannot obtain accurate information.

A quantum key distribution system (QKDS) is a system that enables a transmitter and a receiver to share a quantum cipher having such characteristics.

FIG. 1 is a conceptual diagram of a conventional quantum cryptographic key distribution system.

The quantum cryptographic key distribution system includes a quantum cryptographic key distribution transmitter 110, a quantum cryptographic key distribution receiver 120, a quantum channel 132, and a public or open channel 134.

The transmitter 110 of the quantum cryptographic key distribution system carries cryptographic key information on a single photon and transmits it through the quantum channel 132 in a manner of controlling the phase or polarization of the single photon. The receiver 120 of the quantum cryptographic key distribution system extracts cryptographic key information by using a phase modulator and an interferometer, a polarization beam splitter, or the like.

Quantum cryptographic key distribution systems are implemented using conventional optical communications and optical techniques. In particular, a phase-modulation-type quantum cryptographic key distribution system typically detects signals transmitted through a phase modulator and an interferometer located at a receiver.

The interference performance of the interferometer included in the quantum cryptographic key distribution system is very sensitive to environmental changes such as temperature and vibration, and the change in the effective optical path length caused by such environmental changes has a substantial impact on the overall performance of the quantum cryptographic key distribution system.

Therefore, in order to improve the quantum bit error rate (QBER) of the quantum cryptographic key distribution system, a method is needed capable of quickly and efficiently compensating for errors caused by temperature changes of an optical system such as an interferometer or due to other factors.

In addition, a polarization-modulation-type quantum cryptographic key distribution system typically detects signals through a polarization beam splitter located at a receiver. However, the polarization of the transmit signal constantly changes over time in the optical fiber as a transmission medium. This requires a function of aligning the polarization beam splitter with the polarization of the input signal. The accuracy of this alignment affects the quantum bit error rate of the quantum cryptographic key distribution system. Therefore, there is a need for a method capable of quickly and efficiently compensating for an error between the optical-fiber-inflected polarization axis of the signal light and the axis of the polarization beam splitter.

SUMMARY

Technical Problem

The present disclosure in some embodiments seeks to provide an apparatus and method for quantum cryptographic key distribution stabilization which can quickly and efficiently compensate for errors caused by changes in the effective optical path length of an interferometer; changes in the polarization axis, and the like to improve performance of a quantum cryptographic key distribution system.

Technical Solution

At least one embodiment of the present disclosure provides an apparatus for quantum cryptographic key distribution stabilization, including a negative feedback signal generation unit, a correction value calculation unit, and a control unit. The negative feedback signal generation unit is configured to generate a negative feedback signal by using a count value of detections that are discarded without being used for cryptographic key generation from among photon detection-related values generated by a receiver. The correction value calculation unit is configured to calculate a correction value for an error to be compensated for upon receiving the negative feedback signal. The control unit is configured to transmit the correction value to a transmitter or a receiver for causing the transmitter and/or the receiver to control at least one variation factor that affects a phase or a polarization to thereby stabilize the phase or the polarization.

Another embodiment of the present disclosure provides a method for quantum cryptographic key distribution stabilization, including generating a negative feedback signal by using a count value of detections that are discarded without being used for cryptographic key generation from among photon detection-related values generated by a receiver, and calculating a correction value for an error to be compensated for upon receiving the negative feedback signal, and performing a control including transmitting the correction value to a transmitter or a receiver and causing the transmitter and/or the receiver to control at least one variation factor that affects a phase or a polarization to thereby stabilize the phase or the polarization.

Advantageous Effects

According to at least one embodiment of the present disclosure, there is an effect of efficiently compensating for an error caused by changes in the effective optical path length of the optical system included in the quantum cryptographic key distribution system.

According to another aspect of at least one embodiment of the present disclosure, one can know the initial control direction of an error occurring in the quantum cryptographic key distribution system, as well as the degree of deviation from the optimum point, so that the error can be quickly controlled.

The present disclosure in yet another aspect of at least one embodiment can take advantage of the conventional quantum cryptographic key distribution system unaltered, which effects the ease of applicability and cost-saving advantage.

Figure 1:
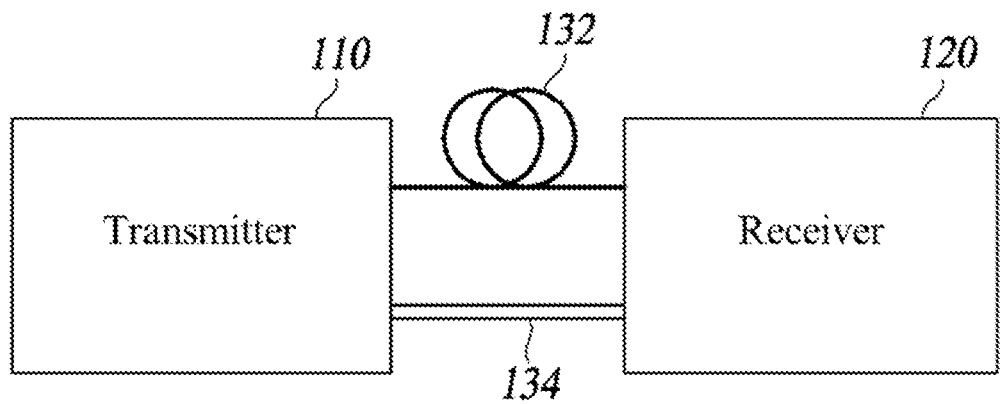
FIG. 1 is a conceptual diagram of a conventional quantum cryptographic key distribution system.

REFERENCE NUMERALS 110, 310, 410, 1110, 1210: transmitter
120, 350, 450, 1150, 1250: receiver
132, 250, 342, 442, 1142, 1242: quantum channel
134, 260, 344, 444, 544, 644, 744, 844, 1144, 1244: public channel
100, 200, 300, 400, 500, 600, 700, 800, 1100, 1200: quantum cryptographic key distribution stabilization apparatus
212, 322, 422, 1122, 1222: light source
220, 330, 430, 730, 830, 1130, 1230: transmission signal processing unit
240, 370, 470, 560, 660, 760, 860, 1170, 1270: reception signal processing unit
572, 672, 772: negative feedback signal generation unit
574, 674, 774: correction value calculation unit
576, 676, 776: light path control unit
580, 680, 780, 880: object subject to variation of effective light path length

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Hereinafter, an apparatus and method for stabilizing a quantum cryptography communication system according to embodiments of the present disclosure will be described with reference to the accompanying drawings.

Figure 2:
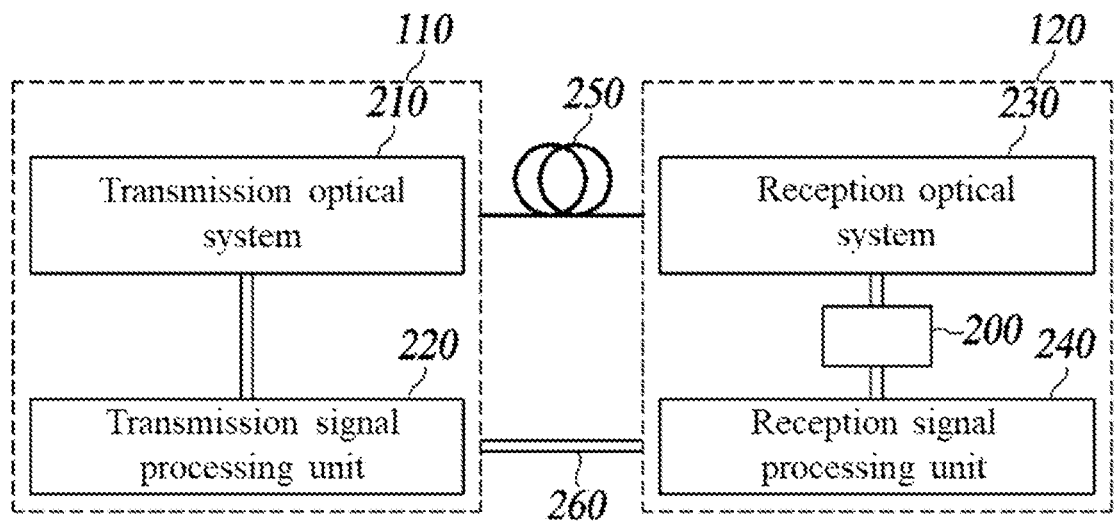
FIG. 2 is a conceptual diagram of a quantum cryptographic key distribution stabilization apparatus according to at least one embodiment of the present disclosure.

FIG. 2 is a conceptual diagram of a quantum cryptographic key distribution stabilization apparatus according to at least one embodiment of the present disclosure.

A quantum cryptographic key distribution stabilization apparatus 200 is linked to a transmitter 110 and a receiver 120 for quantum cryptographic key distribution, to perform data communications. Hereinafter, unless stated otherwise, each of the transmitter and the receiver means a transmitter and a receiver for quantum cryptographic key distribution.

FIG. 2 illustrates a case where a quantum cryptographic key distribution stabilization apparatus according to at least one embodiment of the present disclosure is located at a receiver.

The transmitter 110 includes a transmission optical system 210 and a transmission signal processing unit 220. The transmission optical system 210 generates a single photon and performs modulation to load information on the generated single photon.

The transmission signal processing unit 220 is connected to the receiver 120 through a public channel 260 to perform data communications and transmits information for driving the quantum cryptographic key distribution stabilization apparatus 200 connected to a reception signal processing unit 240. The transmission signal processing unit 220 generates information for quantum cryptographic key distribution and stores the generated information. The information for quantum cryptographic key distribution includes bit information and basis information. The transmission signal processing unit 220 transmits the information for quantum cryptographic key distribution to the transmission optical system 210, and shares the information for quantum cryptographic key distribution with the quantum cryptographic key distribution stabilization apparatus 200 and the receiver 120.

The information transmitted and received by the transmission signal processing unit 220 to and from the receiver 120 may be intercepted, and therefore the transmission signal processing unit 220 does not exchange cryptographic key information through the public channel 260. The quantum cryptographic key distribution stabilization apparatus 200 improves the quantum bit error rate (QBER) quickly and efficiently by temporarily controlling the components included in the transmission optical system 210 based on the data received from the transmission signal processing unit 220.

The receiver 120 includes a reception optical system 230, the reception signal processing unit 240, and the quantum cryptographic key distribution stabilization apparatus 200. The receiver 120 receives a single photon transmitted from the transmitter 110 and extracts a cryptographic key. The quantum cryptographic key distribution stabilization apparatus 200 may temporarily control the components included in the reception optical system 230 based on the data received from the reception signal processing unit 240.

The transmitter 110 and the receiver 120 according to at least one embodiment of the present disclosure may follow the Bennet Brassard 84 (B384) protocol. The B384 protocol is implemented by combining two basis information and bit information. At this time, the bit information is represented by using two states orthogonal to each other. Accordingly, the transmission optical system 210 may include two modulators for controlling bit information and basis information. For example, the transmission optical system 210 may have a first modulator (not shown) for modulating bit information, and a second modulator (not shown) for modulating basis information. Or the first and second modulators may be configured to modulate each other's information.

The single photon modulated by the transmission optical system 210 may include modulated bit information and modulated basis information. The single photon modulated by the transmission optical system 210 is transmitted to the receiver 120 through the quantum channel 250.

The receiver 120 receives a single photon transmitted from the transmitter 110 and extracts a cryptographic key. The quantum cryptographic key distribution stabilization apparatus 200 may temporarily control the components included in the reception optical system 230 based on the data received from the reception signal processing unit 240.

Figure 3:
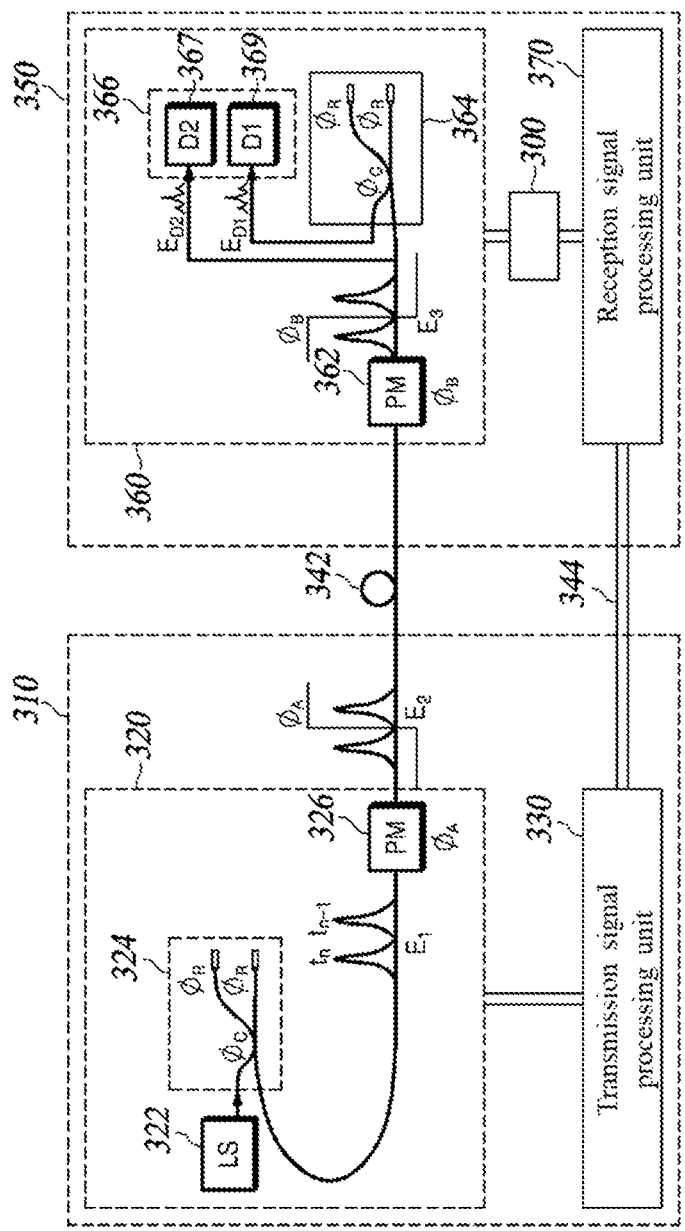
FIG. 3 is an illustrative diagram of a Michelson phase-modulated quantum cryptographic key distribution transceiver to which a quantum cryptographic key distribution stabilization apparatus according to at least one embodiment of the present disclosure is applied.

Although the quantum cryptographic key distribution stabilization apparatus 200 of FIG. 2 is located in the receiver 120, it may be disposed in the transmitter 110, and implemented as a separate stand-alone device, FIG. 3 is an illustrative diagram of a Michelson phase-modulated quantum cryptographic key distribution transceiver to which a quantum cryptographic key distribution stabilization apparatus according to at least one embodiment of the present disclosure is applied.

A quantum cryptographic key distribution stabilization apparatus 300 according to at least one embodiment of the present disclosure is directly or indirectly connected to a transmitter 310 and a receiver 350 to perform data communications.

The transmitter 310 includes a transmission optical system 320 and a transmission signal processing unit 330, The transmission optical system 320 generates a single photon and performs phase modulation to load information on the generated single photon.

The transmission optical system 320 may include a light source 322, a transmission interferometer 324, and a transmission phase modulator 326. The transmission optical system 320 according to at least one embodiment of the present disclosure has a structure in which the transmission interferometer 324 and the transmission phase modulator 326 are separated, although it may have a structure in which the transmission interferometer 324 and the transmission phase modulator 326 are integrated.

Suitable as the light source 322 is a laser that has light emitted in single mode and characteristically narrow linewidth and stable polarization.

The light source 322 may include a semiconductor laser such as a distributed feedback (DFB), a vertical-surface emitting laser (VCSEL), a distributed Bragg reflector (DBR) laser, or a laser such as a solid-state laser, a gas laser, or the like.

The light source 322 may be formed by further adding an optical attenuator (not shown) or an optical modulator (not shown) to the above-described laser, in order to generate a single photon. In addition, the optical attenuator may be separated from the light source 322 and positioned anywhere on the optical path of the transmitter 310 to attenuate optical signals transmitted to a quantum channel 342.

The transmission interferometer 324 splits photons received from the light source 322 into at least two optical paths. Here, at least two light paths are designed to have different effective optical path lengths. Thus, the photons passing through the transmission interferometer 324 are separated in time.

The at least two optical paths according to at least one embodiment of the present disclosure include two different optical paths, long path $t_n$ and short path $t_{n-1}$. Assuming that the optical pulse generated by the light source 322 follows a Gaussian distribution, the optical pulse passing through the transmission interferometer 324 may be represented as Equation 1.

$$E_1 = E_0 e^{\frac{-1}{2\sigma^2}(t-t_n)^2 - i\omega(t-t_n)} + E_0 e^{\frac{-1}{2\sigma^2}(t-t_{n-1})^2 - i\omega(t-t_{n-1})} \quad \text{Equation 1}$$

Where $E_0$ denotes the amplitude of the optical pulse, σ the pulse width, ω the angular frequency, t indicates time, and $t_n$ and $t_{n-1}$ the time delays that occur passing through the long and short paths, respectively.

The transmission phase modulator 326 modulates the phase by TA of the optical pulses transmitted therethrough. At this time, the transmission phase modulator 326 may simultaneously modulate the phases of the two optical pulses passing through the long path and the short path and may modulate one optical pulse selected from the two optical pulses.

When modulating one optical pulse selected from two optical pulses, only the phase of one optical pulse passing through the short path or the long path is modulated by $\varphi_A$.

When simultaneously modulating the phases of two optical pulses, an optical pulse $E_2$ right after passing through the transmission phase modulator 326 may be represented as Equation 2.

$$E_2 = E_0 e^{\frac{-1}{2\sigma^2}(t-t_n)^2 - i\omega(t-t_n) - i\frac{\phi_A}{2}} + E_0 e^{\frac{-1}{2\sigma^2}(t-t_{n-1})^2 - i\omega(t-t_{n-1}) + i\frac{\phi_A}{2}} \quad \text{Equation 2}$$

Here, $\varphi_A$ is the magnitude of the phase modulated by the transmission phase modulator 326. The transmission phase modulator 326 according to at least one embodiment of the present disclosure modulates the phases of the two optical pulses separated in time by $-\varphi_A/2$ and $\varphi_A/2$ respectively and thereby modulating the total phase difference to be $\varphi_A$ between the two optical pulses separated in time.

The transmitter 310 and the receiver 350 according to at least one embodiment of the present disclosure may follow the BB84 protocol. Accordingly, the transmission phase modulator 326 may include two modulators for controlling bit information and basis information. The first modulator (not shown) of the transmission phase modulator 326 modulates the bit information, and the second modulator (not shown) modulates the basis information.

The optical pulse modulated by the transmission phase modulator 326 may include modulated bit information and modulated basis information. Thereafter, the optical pulses modulated by the transmission phase modulator 326 are transmitted to the receiver 350 through the quantum channel 342.

The receiver 350 according to at least one embodiment of the present disclosure includes a reception phase modulator 362, a reception interferometer 364, and a detector 366. The reception optical system 360 according to at least one embodiment of the present disclosure has a structure in which the reception phase modulator 362 and the reception interferometer 364 are separated, although it may have a structure in which the reception phase modulator 362 and the reception interferometer 364 are integrated.

The reception phase modulator 362 modulates the phase of the optical pulse received through the quantum channel 342. The phase to be added by the reception phase modulator 362 is $\varphi B$. An optical pulse $E_3$ right after passing through the reception phase modulator 362 may be represented as Equation 3, $$E_3 = E_0 e^{\frac{-1}{2\sigma^2}(t-t_n)^2 - i\omega(t-t_n) - i\frac{\phi_A}{2} + i\frac{\phi_B}{2}} + E_0 e^{\frac{-1}{2\sigma^2}(t-t_{n-1})^2 - i\omega(t-t_{n-1}) + i\frac{\phi_A}{2} - i\frac{\phi_B}{2}} \quad \text{Equation 3}$$

Here, $\varphi_B$ is the magnitude of the phase modulated by the reception phase modulator 362. The reception phase modulator 362 according to at least one embodiment of the present disclosure modulates the phases of the two optical pulses separated in time by $-\varphi_B/2$ and $\varphi_B/2$ respectively and thereby modulating the total phase difference to be $\varphi_B$ between the two optical pulses separated in time.

However, when modulating one optical pulse selected from two optical pulses, only the phase of one optical pulse passing through the short path or the long path may be modulated by $\varphi_B$.

The optical pulse modulated by the reception phase modulator 362 is incident on the reception interferometer 364. The optical pulses passing through the reception interferometer 364 are incident on the detector 366. The reception interferometer 364 may include an optical circulator (not shown) so that the optical pulse output from the reception interferometer 364 does not face the input side but toward the detection unit 366. Optical pulses, $E_{D1}$ and $E_{D2}$ incident on a first single-photon detector 369 and a second single-photon detector 367 included in the detector 366 may be represented by Equation 4 and Equation 5, respectively.

$$E_{D1} = \frac{E_0}{\sqrt{2}} e^{\frac{-1}{2\sigma^2}(t-t_n-t_s)^2} e^{-i\omega(t-t_n-t_s) - i\frac{\phi_A}{2} + i\frac{\phi_B}{2} + i\phi_C} + \frac{E_0}{\sqrt{2}} e^{\frac{-1}{2\sigma^2}(t-t_n-t_l)^2} e^{-i\omega(t-t_n-t_l) - i\frac{\phi_A}{2} + i\frac{\phi_B}{2} + i\phi_C} + \frac{E_0}{\sqrt{2}} e^{\frac{-1}{2\sigma^2}(t-t_{n-1}-t_s)^2} e^{-i\omega(t-t_{n-1}-t_s) + i\frac{\phi_A}{2} - i\frac{\phi_B}{2} + i\phi_C} + \frac{E_0}{\sqrt{2}} e^{\frac{-1}{2\sigma^2}(t-t_{n-1}-t_l)^2} e^{-i\omega(t-t_{n-1}-t_l) + i\frac{\phi_A}{2} - i\frac{\phi_B}{2} + i\phi_C} \quad \text{Equation 4}$$

$$E_{D2} = \frac{E_0}{\sqrt{2}} e^{\frac{-1}{2\sigma^2}(t-t_n-t_s)^2} e^{-i\omega(t-t_n-t_s) - i\frac{\phi_A}{2} + i\frac{\phi_B}{2}} + \frac{E_0}{\sqrt{2}} e^{\frac{-1}{2\sigma^2}(t-t_n-t_l)^2} e^{-i\omega(t-t_n-t_l) - i\frac{\phi_A}{2} + i\frac{\phi_B}{2} + i2\phi_C} + \frac{E_0}{\sqrt{2}} e^{\frac{-1}{2\sigma^2}(t-t_{n-1}-t_s)^2} e^{-i\omega(t-t_{n-1}-t_s) + i\frac{\phi_A}{2} - i\frac{\phi_B}{2}} + \frac{E_0}{\sqrt{2}} e^{\frac{-1}{2\sigma^2}(t-t_{n-1}-t_l)^2} e^{-i\omega(t-t_{n-1}-t_l) + i\frac{\phi_A}{2} - i\frac{\phi_B}{2} + i2\phi_C} \quad \text{Equation 5}$$

Here, $t_l$, $t_s$, and $\varphi_c$ are combined phases added by a receiver long path, a receiver short path, and the reception interferometer 364, respectively. Of the terms in Equation 4 and Equation 5, the middle two terms are independent of interference because they do not overlap in time, and only the first and fourth terms contribute to the interference. Therefore, $E_{D1}$ and $E_{D2}$ can be represented by Equation 6 and Equation 7, respectively.

$$E_{D1} \equiv \frac{E_0}{\sqrt{2}} e^{\frac{-1}{2\sigma^2}(t-t_{n-1}-t_l)^2} e^{-i\omega(t-t_{n-1}-t_l) + i\frac{\phi_A}{2} - i\frac{\phi_B}{2} + i\phi_C} + \frac{E_0}{\sqrt{2}} e^{\frac{-1}{2\sigma^2}(t-t_n-t_s)^2} e^{-i\omega(t-t_n-t_s) - i\frac{\phi_A}{2} + i\frac{\phi_B}{2} + i\phi_C} \quad \text{Equation 6}$$

$$E_{D2} \equiv \frac{E_0}{\sqrt{2}} e^{\frac{-1}{2\sigma^2}(t-t_{n-1}-t_l)^2} e^{-i\omega(t-t_{n-1}-t_l) + i\frac{\phi_A}{2} - i\frac{\phi_B}{2} + i2\phi_C} + \frac{E_0}{\sqrt{2}} e^{\frac{-1}{2\sigma^2}(t-t_n-t_s)^2} e^{-i\omega(t-t_n-t_s) - i\frac{\phi_A}{2} + i\frac{\phi_B}{2}} \quad \text{Equation 7}$$

Since the single-photon detector detects the intensity of the optical pulse, it detects a signal proportional to the square of the electric field. Therefore, the signal detected by the first single-photon detector 369 and the second single-photon detector 367 may be represented by Equation 8 and Equation 9, respectively. Here, $2\varphi_c = \pi$.

$$|E_{D1}|^2 = 2A[1 + \cos[\omega\{(t_n - t_{n-1}) - (t_l - t_s)\} + \phi_A - \phi_B]] \quad \text{Equation 8}$$

$$|E_{D2}|^2 = 2A[1 + \cos[\omega\{(t_n - t_{n-1}) - (t_l - t_s)\} + \phi_A - \phi_B + \pi]] \quad \text{Equation 9}$$

Where A is equal to Equation 10.

$$A = \frac{E_0^2}{2} e^{\frac{-1}{\sigma^2}(t-t_{n-1}-t_l)^2} = \frac{E_0^2}{2} e^{\frac{-1}{\sigma^2}(t-t_n-t_s)^2} \quad \text{Equation 10}$$

Figure 4:
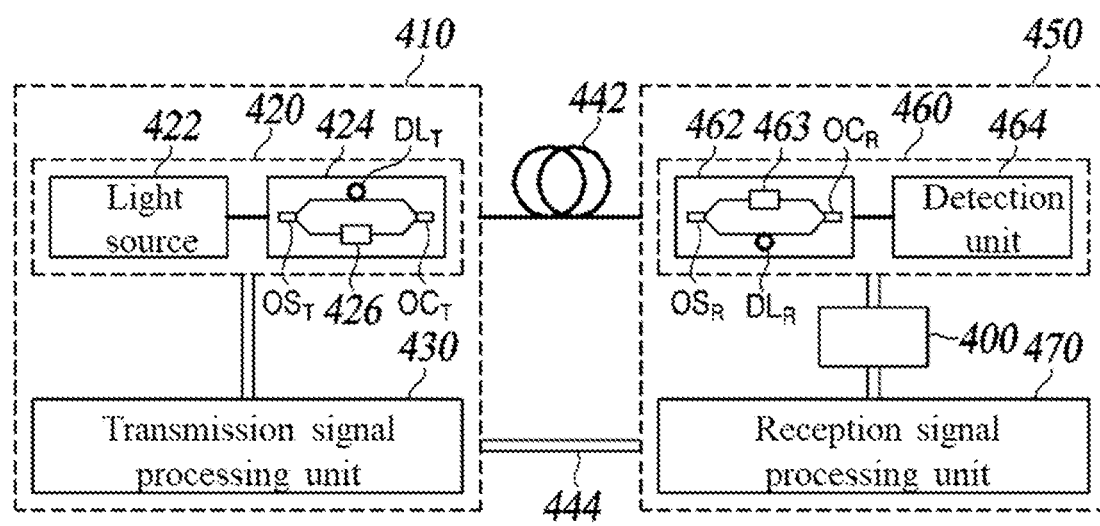
FIG. 4 is an illustrative diagram of a Mach-Zehnder phase-modulated quantum cryptographic key distribution transceiver to which a quantum cryptographic key distribution stabilization apparatus according to at least one embodiment of the present disclosure is applied.

FIG. 4 is an illustrative diagram of a Mach-Zehnder phase-modulated quantum cryptographic key distribution transceiver to which a quantum cryptographic key distribution stabilization apparatus according to at least one embodiment of the present disclosure is applied.

Each of a transmitter 410 and a receiver 450 shown in FIG. 4 performs the same function as each of the transmitter 310 and the receiver 350 shown in FIG. 3. However, the transmission optical system 420 of FIG. 4 has a structure in which a transmission interferometer 424 and a transmission phase modulator 426 are integrated, and in which a reception optical system 460 is integrated with a reception interferometer 462 and the reception phase modulator 463. Each of the transmission optical system 420 and the reception optical system 460 of FIG. 4 may have a structure in which an interferometer and a modulator are separated as in the transmission optical system 320 shown in FIG. 3. Each of the transmission phase modulator 426 and the reception phase modulator 463 includes a Mahzander interferometer for modulation of optical pulses.

The transmission interferometer 424 includes a transmission optical splitter $OS_T$, a transmission optical delay line $DL_T$, a transmission phase modulator 426, and a transmission optical coupler $OC_T$. The reception interferometer 462 includes a reception optical splitter $OS_R$, a reception optical delay line $DL_R$, the reception phase modulator 463, and a reception optical coupler $OC_R$.

A quantum cryptographic key distribution stabilization apparatus 400 according to at least one embodiment of the present disclosure is connected to the reception optical system 460 and the reception signal processing unit 470 to perform data communications. In the present embodiment, the quantum cryptographic key distribution stabilization apparatus 400 is included in the receiver 450, but it may be included in the transmitter 410. In addition, the quantum cryptographic key distribution stabilization apparatus 400 may be included in the reception signal processing unit 470 or the transmission signal processing unit 430 of the transmitter 410.

The receiver 450 detects a single photon by receiving an optical pulse transmitted from the transmitter 410. The quantum cryptographic key distribution stabilization apparatus 400 receives the detected result. The process up to where the receiver 450 detects a single photon by receiving an optical pulse from the transmitter 410 through a quantum channel 442 is the same as that of the quantum cryptographic key distribution stabilization apparatus 300 described above.

One of the two temporally separated optical pulses inputted to the reception interferometer 462 of the receiver 450 is phase modulated by $\varphi_A$ by the transmission phase modulator 426 of the transmitter 410, and the other is phase modulated by $\varphi_B$ in the process of passing through the reception phase modulator 463.

The reception interferometer 462 is an asymmetric interferometer with different optical paths. The reception interferometer 462 outputs a pair of interference results based on two temporally separated optical pulses inputted thereto. The two optical pulses separated in time passing through different optical paths generate a transmission delay corresponding to the length difference of the optical paths. In other words, the two temporally separated optical pulses inputted to the reception interferometer 462 are divided into four optical pulses separated in time. Of the four optical pulses separated in time, two optical pulses adjacent or overlapped in time cause constructive interference or destructive interference, which increases or decreases their sizes. Such interference by the optical pulses separated in time affects the detection rate in the detector 464. The detection unit 464 may exhibit the maximum detection rate when the constructive interference occurs at the maximum, and the minimum detection rate when the destructive interference occurs at the maximum.

However, there are cases where the effective optical path length of the optical path included in the reception interferometer 462 comes to be different from a preset value, such as, where a higher or lower temperature of the reception interferometer 462 than a preset temperature causes undesirable changes in the effective optical path length of the optical path included in the reception interferometer 462, or where a change in the physical length due to vibration or other environmental change results in undesirably changed effective optical path length thereof. Then, the relative phase change of the two temporally overlapped optical pulses out of the four optical pulses outputted from the reception interferometer 462 causes a change in the interference. In other words, constructive or destructive interference does not completely occur at the two outputs of the reception interferometer 462, so that the two outputs may exhibit values that deviate from the maximum detection rate or the minimum detection rate.

Figure 5:
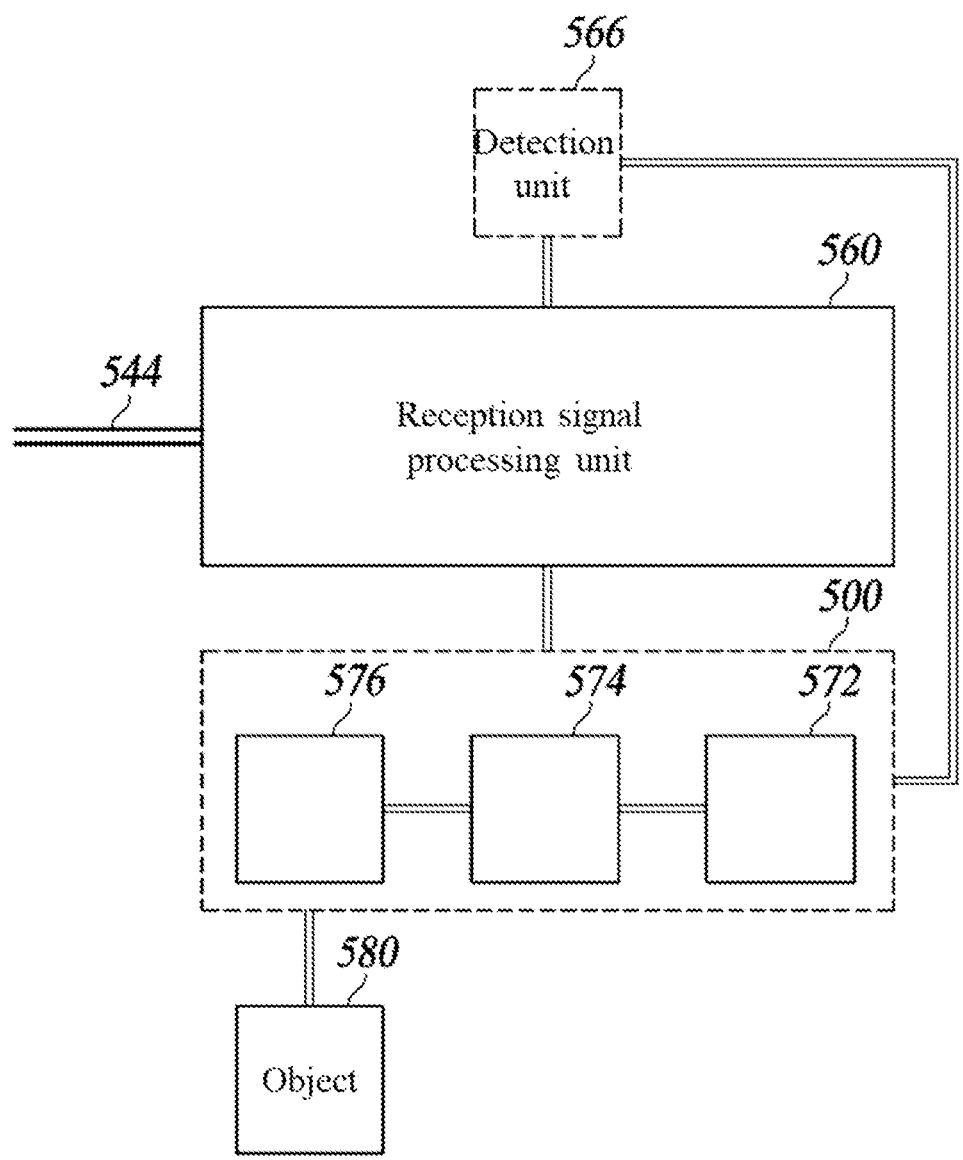
FIG. 5 is an illustrative diagram for describing the operation of a quantum cryptographic key distribution stabilization apparatus according to at least one embodiment of the present disclosure.

FIG. 5 is an illustrative diagram for describing the operation of a quantum cryptographic key distribution stabilization apparatus according to at least one embodiment of the present disclosure.

Figure 10:
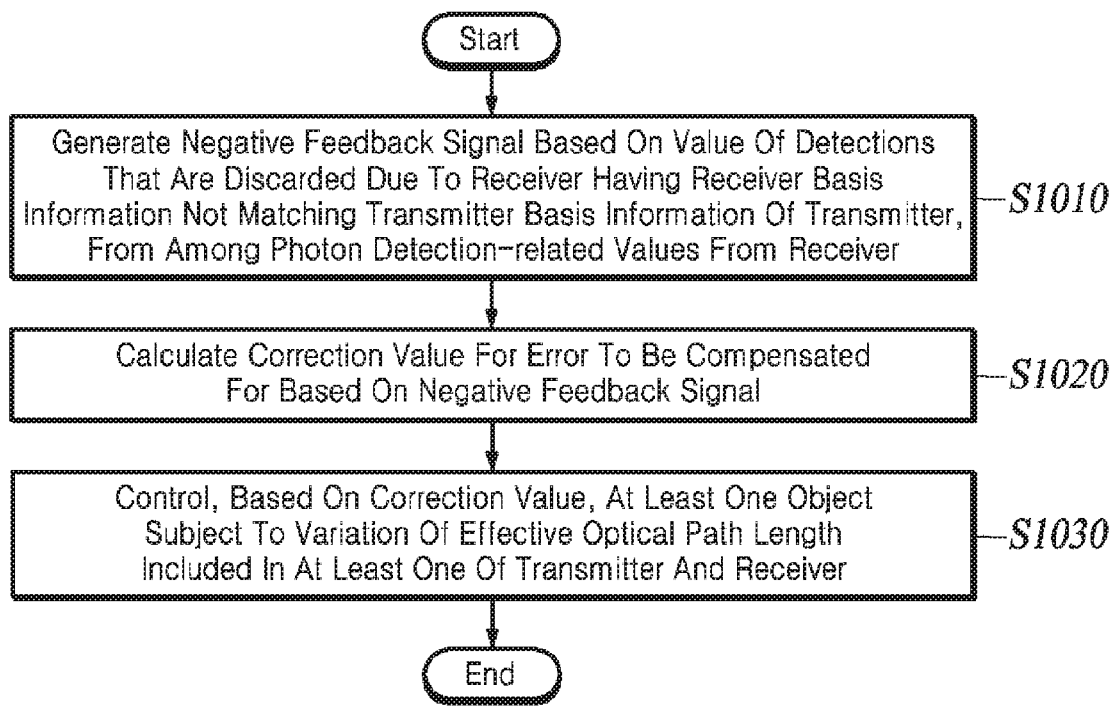
FIG. 10 is a flowchart of a quantum cryptographic key distribution stabilization method according to at least one embodiment of the present disclosure.

In FIG. 5, the transmitter is omitted from the illustration to describe the operation of a quantum cryptographic key distribution stabilization apparatus 500 in more detail. Referring to FIG. 10 together, a quantum cryptographic key distribution stabilization method will also be described.

The quantum cryptographic key distribution stabilization apparatus 500 according to at least one embodiment of the present disclosure is connected to a detection unit 566 and a reception signal processing unit 560 to perform data communications. The quantum cryptographic key distribution stabilization apparatus 500 is connected through a public channel 544 to a transmission signal processing unit (not shown) and a reception signal processing unit 560 and transmits and receives, from and to thereof, various information for stabilizing quantum cryptographic key distribution. Here, the information for stabilizing quantum cryptographic key distribution includes information for changing the effective optical path length of at least one object 580 subject to variation of effective optical path length, which is included in the transmitter or receiver. Here, the object 580 subject to variation of effective optical path length may be an interferometer of a type including or separated from the phase modulator.

In case where the optical path difference of two overlapping paths of multiple single-photon transmission paths formed between the transmitter and the receiver is shifted from the initially set optical path difference, the effective optical path length included in the receiver may be regulated to stabilize the detection rate which is affected by the set value such as the phase between the output from the transmitter and the output from the receiver into the value at the initial setting. By correcting the phase through changing the effective optical path length included in the receiver, transmitter basis information of the transmitter when matching receiver basis information of the receiver allows the detection results at the detection unit 566 to exhibit the maximum detection rate and the minimum detection rate.

The quantum cryptographic key distribution stabilization apparatus 500 may include a negative feedback signal generation unit 572, a correction value calculation unit 574, and an optical path control unit 576.

The negative feedback signal generation unit 572 generates a negative feedback signal based on the count value of single-photon detections by the detection unit 566 (Step S1010). The negative feedback signal may include a count value of detections obtained based on the basis information of the transmitter, bit information, and the basis information of the receiver.

The negative feedback signal generation unit 572 transmits the generated negative feedback signal to the correction value calculation unit 574.

The correction value calculation unit 574 receives the negative feedback signal generated by the negative feedback signal generation unit 572 and calculates a correction value for an error to be compensated for (Step S1020). Here, the error to be compensated for may be a deviation of the effective optical path length of the object (not shown) subject to variation of effective optical path length included in the transmitter, or a deviation of the effective optical path length of the object 580 subject to variation of effective optical path length included in the receiver.

The object subject to variation of effective optical path length, which is an element with variable effective optical path length, may be among others (1) an interferometer composed of a free-space optical system including an optical fiber or a flat optical waveguide or a plurality of mirrors and a beam splitter, and the like, (2) an element capable of varying the effective optical path length of the interferometer, which includes a temperature controller, a piezoelectric device, a mechanical device, etc.

The optical path control unit 576 controls, based on the correction value generated by the correction value calculation unit 574, at least one object subject to variation of effective optical path length included in at least one of the transmitter and the receiver (Step S1030). The object subject to variation of effective optical path length is directly controlled by the quantum cryptographic key distribution stabilization apparatus 500.

Figure 6:
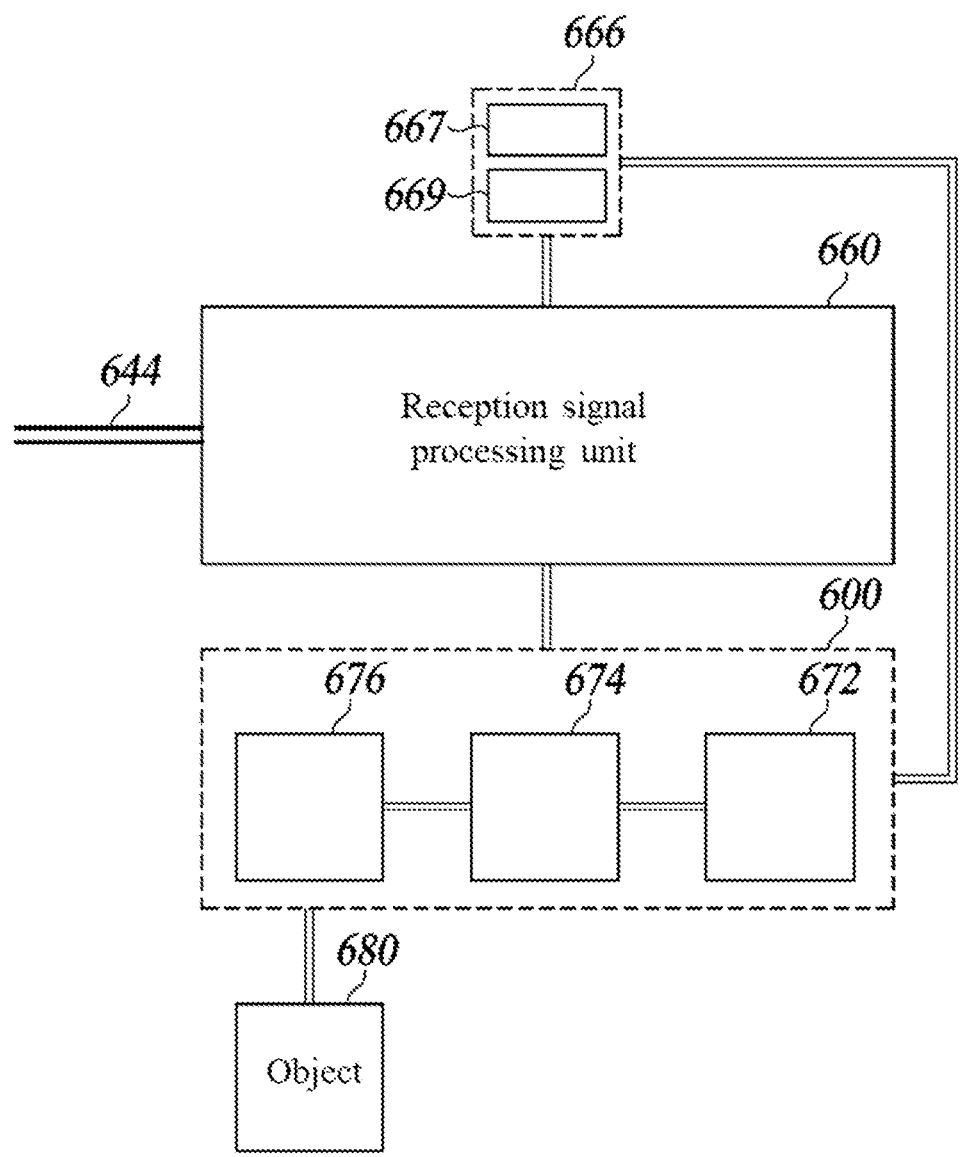
FIG. 6 is another illustrative diagram for describing the operation of a quantum cryptographic key distribution stabilization apparatus according to at least one embodiment of the present disclosure.

FIG. 6 is another illustrative diagram for describing the operation of a quantum cryptographic key distribution stabilization apparatus according to at least one embodiment of the present disclosure.

The quantum cryptographic key distribution stabilization apparatus 600 according to at least one embodiment of the present disclosure illustrated in FIG. 6 performs the same function as the quantum cryptographic key distribution stabilization apparatus 500 illustrated in FIG. 5. The only difference of the quantum cryptographic key distribution stabilization apparatus 600 is its respective linkages with two different single-photon detectors 669 and 667 of a detection unit 666 to perform data communications.

The first single-photon detector 669 and the second single-photon detector 667 operate in gated Geiger mode to detect single photons that add together or cancel each other, neither add together nor cancel each other by constructive or destructive interference. The quantum cryptographic key distribution stabilization apparatus 600 stabilizes the quantum cryptographic key distribution system by analyzing related to detected signal-related information supplied respectively from the first single-photon detector 669 and the second single-photon detector 667 along with information supplied by a transmission signal processing unit (not shown) and a receiver signal processing unit 660 in the course of their signal processing.

The reception signal processing unit 660 may also receive the detected signals respectively from the first single-photon detector 669 and the second single-photon detector 667, store the detection signals, and transmit some detection-related information to the transmitter for cryptographic key extraction.

The quantum cryptographic key distribution stabilization apparatus 600 according to at least one embodiment of the present disclosure is linked to the detection unit 666 and the reception signal processing unit 660 to perform data communications. Information that the quantum cryptographic key distribution stabilization apparatus 600 exchanges with the detection unit 666 and the reception signal processing unit 660 may include the detection values from the detection unit 666 and information for stabilizing a phase difference between a transmission interferometer and a reception interferometer.

The quantum cryptographic key distribution stabilization apparatus 600 receives information related to the count value of detections by the first single-photon detector 669 and the second single-photon detector 667 included in the detection unit 666, to generate a negative feedback signal for quantum cryptographic key distribution. The quantum cryptographic key distribution stabilization apparatus 600 calculates a correction value based on the generated negative feedback signal, and utilizes the calculated correction value to control the object subject to variation of effective optical path length, thereby minimizing the phase difference between the transmitter and the receiver, resulting in a stabilized quantum cryptographic key distribution transmission-reception system.

In case where the optical path difference between the transmitter and the receiver is shifted from the initially set value, changing the effective optical path length of an object 680 subject to variation of effective optical path length included in the transmitter or the receiver allows the phase difference between the output from the transmitter and the output from the receiver to be reconditioned to the phase difference initially set. By correcting the phase in the transmitter or the receiver through changing the effective optical path length of the object 680 subject to variation of effective optical path length included in the transmitter or the receiver, the detection rates measured by the detection unit 566 are capable of exhibiting the maximum detection rate and the minimum detection rate.

When using the method of correcting the phase of an optical pulse via an optical path included in either of the transmitter and the receiver, it is not necessary to correct the absolute value of a changed effective optical path length to be equal to the initially set effective optical path length. The key factor in stabilizing the detection rate in the detection unit 566 is not the absolute effective optical path lengths of the transmitter and receiver, but the relative phase differences caused by two optical paths by which separated single-photon pulses overlap and cause interference among all occasions by the entire optical path extending from the transmitter to the receiver, inclusive of their internal paths.

Table 1 shows an arrangement of phase modulation amounts of the transmitter and the receiver complying with the BB84 protocol, and detections by the receiver according to changes in the phase modulation amounts.

TABLE 1

| Transmitter Bit Information | Transmitter Basis Information | Receiver Basis Information | D1 Detection Rate (%) | D2 Detection Rate (%) | Detection Count Value Representation | Detection Count Value Increase or Decrease |
|---|---|---|---|---|---|---|
| 0 | 0 | 0 | 100 | 0 | | |
| 0 | 0 | $-\pi/2$ | 50 | 50 | $D1_{00}, D2_{00}$ | $-, +$ |
| 0 | $\pi/2$ | 0 | 50 | 50 | $D1_{01}, D2_{01}$ | $+, -$ |
| 0 | $\pi/2$ | $-\pi/2$ | 100 | 0 | | |
| $\pi$ | 0 | 0 | 0 | 100 | | |
| $\pi$ | 0 | $-\pi/2$ | 50 | 50 | $D1_{10}, D2_{10}$ | $+, -$ |
| $\pi$ | $\pi/2$ | 0 | 50 | 50 | $D1_{11}, D2_{11}$ | $-, +$ |
| $\pi$ | $\pi/2$ | $-\pi/2$ | 0 | 100 | | |

For the convenience of the explanation of Table 1, the following description will be provided with reference to FIGS. 3 and 6 together. When there are two single-photon detectors used in the detection unit 366, 666, and the transmitter 310 and the receiver 350 comply with the BB84 protocol, the single-photon detection may have eight occasions, as shown in Table 1.

The first column and the second column represent the amount of bit information modulation and the amount of basis information modulation by the transmission phase modulator 326 included in the transmitter 310, respectively. The third column shows the amount of basis information modulation by the reception phase modulator 362 included in the receiver 350. Herein, the modulation amount is the phase difference between the optical pulse outputted relatively late through the long path and the optical pulse outputted relatively quickly through the short path of the two optical pulses separated in time by the interferometers 324 and 364 included in the respective modulators.

The fourth and fifth columns represent single-photon detection rates at the first single-photon detection units 369, 669 and the second single-photon detection units 367, 667, respectively. The sixth column indicates the count value of detections by the first single-photon detector 369, 669 and the second single-photon detector 367, 667 by using bit information and basis information. The last seventh column indicates the increase or decrease of the count value of detections or the number of detection counts. Here, the count value of detections is defined as being increased when the phase of the receiver 350 becomes relatively larger than the phase of the transmitter 310.

The quantum cryptographic key distribution stabilization apparatus 300, 600 according to embodiments of the present disclosure stabilizes the quantum cryptographic key distribution between the transmitter 310 and the receiver 350 based on the count value of detections selected from among single-photon detection-related values generated by the receiver 350 for being discarded due to the receiver 350 having a receiver basis information which does not match a transmitter basis information of the transmitter. The right values resulting when the transmitter basis information of the transmitter 310 matches the receiver basis information of the receiver 350 will be used to extract the cryptographic key, although not shown in Table 1.

The count value of detections in each detector is expressed as $Dx_{nm}$, wherein x denotes a detector number, m and n denote bit information and basis information of the transmitter 310, respectively. Specifically, the value when x is 1, m is 0, and n is 1 with the bit information and the basis information of the transmitter 310 being 0 and 1, respectively, represents a count value of detections by the first single-photon detector. Although the representation of the basis information of the receiver 350 is omitted, since it does not match the basis information of the transmitter 350, it can be inferred by confirming the value of n. For example, in the case of the count value of detections indicated by $D1_{01}$, the bit information and the basis information of the transmitter 310 are 0 and 1, respectively, and therefore the basis information of the receiver 350 is zero.

Referring to the case where the bit information is 0 in Table 1, it can be seen that $D1_{00}$ and $D1_{01}$, corresponding to the count value of detections by the first single-photon detector 369, 669 move in opposite directions with respect to the temperature change. Specifically, $D1_{00}$ moves in the direction in which the count value of detections decreases, whereas $D1_{01}$ moves in the direction in which the count value of detections increases.

Further, $D2_{00}$ and $D2_{01}$ corresponding to the count values of detections by the second single-photon detector 367, 667 move in opposite directions. Specifically, $D2_{01}$ moves in the direction in which the count value of detections decreases, and $D2_{00}$ moves in the direction in which the count value of detections increases.

It can be seen that the count value of detections by the first single-photon detector 369, 669 and the count value of detections by the second single-photon detector 367, 667 move in different directions. Therefore, calculating the difference between the count value of detections by the first single-photon detector 369, 669 and the count value of detections by the second single-photon detector 367, 667 can consistently express the effects of changes in the transmission interferometer 324 and the reception interferometer 364. The relationship can be expressed between the count value of detections by the first single-photon detector 369, 669 and the count value of detections by the second single-photon detector 367, 667 as Equation 11.

$$X = D1_{00} - D1_{00}) - (D2_{00} - D2_{01}) \quad \text{Equation 11}$$

Here, X is the first negative feedback signal for a value obtained with the bit information being zero. The same applies to a value obtained with the bit information of one. However, the second negative feedback signal obtained with the bit information of 1 has a different direction from that of the first negative feedback signal for the value obtained with the bit information of zero. Accordingly, the second negative feedback signal Y may be expressed as Equation 12 below.

$$Y = -\{(D1_{00} - D1_{01}) - (D2_{00} - D2_{01})\} \quad \text{Equation 12}$$

The count value of detections by the first single-photon detector 369, 669 and the count value of detections by the second single-photon detector 367, 667 may be different from each other due to optical loss in the quantum channel 342 and different detection efficiencies in the detectors. Therefore, in order to compensate for this, the first negative feedback signal and the second negative feedback signal may be normalized. The normalized first and second negative feedback signals are represented by Equation 13 and Equation 14, respectively.

$$X = \frac{(D1_{00} - D1_{01})}{(D1_{00} + D1_{01})} - \frac{(D2_{00} - D2_{01})}{(D2_{00} + D2_{01})} \quad \text{Equation 13}$$

$$Y = -\left\{\frac{(D1_{10} - D1_{11})}{(D1_{10} + D1_{11})} - \frac{(D2_{10} - D2_{11})}{(D2_{10} + D2_{11})}\right\} \quad \text{Equation 14}$$

The negative feedback signal may be obtained by adding up the first negative feedback signal and the second negative feedback signal, which can be expressed as Equation 15.

$$Z = X + Y \quad \text{Equation 15}$$

Here, Z represents a negative feedback signal, and X and Y represent a first negative feedback signal and a second negative feedback signal.

The above-described negative feedback signals are calculated by digitizing the count value of detections, in which at least the phase difference between the transmitter 310 and the receiver 350 are reflected, and the calculation is performed by a negative feedback signal generation unit 572 of the quantum cryptographic key distribution stabilization apparatus 300, 600.

The negative feedback signal generation unit 672 uses the count value of detections generated from the detection results from the first single-photon detector 369, 669 and the second single-photon detector 367, 667 to generate the first negative feedback signal and the second negative feedback signal and add up these two values to generate a negative feedback signal.

The correction value calculation unit 674 calculates, based on the negative feedback signal received from the negative feedback signal generation unit 672, a correction value that needs to be actually controlled to stabilize the quantum cryptographic key distribution. Here, the error to be compensated for may be the amount of change of the effective optical path length included in the transmitter 310 or the receiver 350.

The object 680 subject to variation of effective optical path length, which is an element with variable effective optical path length, may be among others (1) an interferometer composed of a free-space optical system including an optical fiber or a flat optical waveguide or a plurality of mirrors and a beam splitter, and the like, (2) an element capable of varying the effective optical path length of the interferometer, which includes a temperature controller, a piezoelectric device, a mechanical device, etc.

The optical path control unit 676 controls, based on the correction value generated by the correction value calculation unit 674, at least one object 680 subject to variation of effective optical path length included in the receiver 350 (Step S1030). When the light path control unit 676 is included in the transmitter (not shown), the object subject to variation of effective optical path length included in the transmitter is controlled. The object 680 subject to variation of effective optical path length is controlled by the quantum cryptographic key distribution stabilization apparatus 600.

Figure 7:
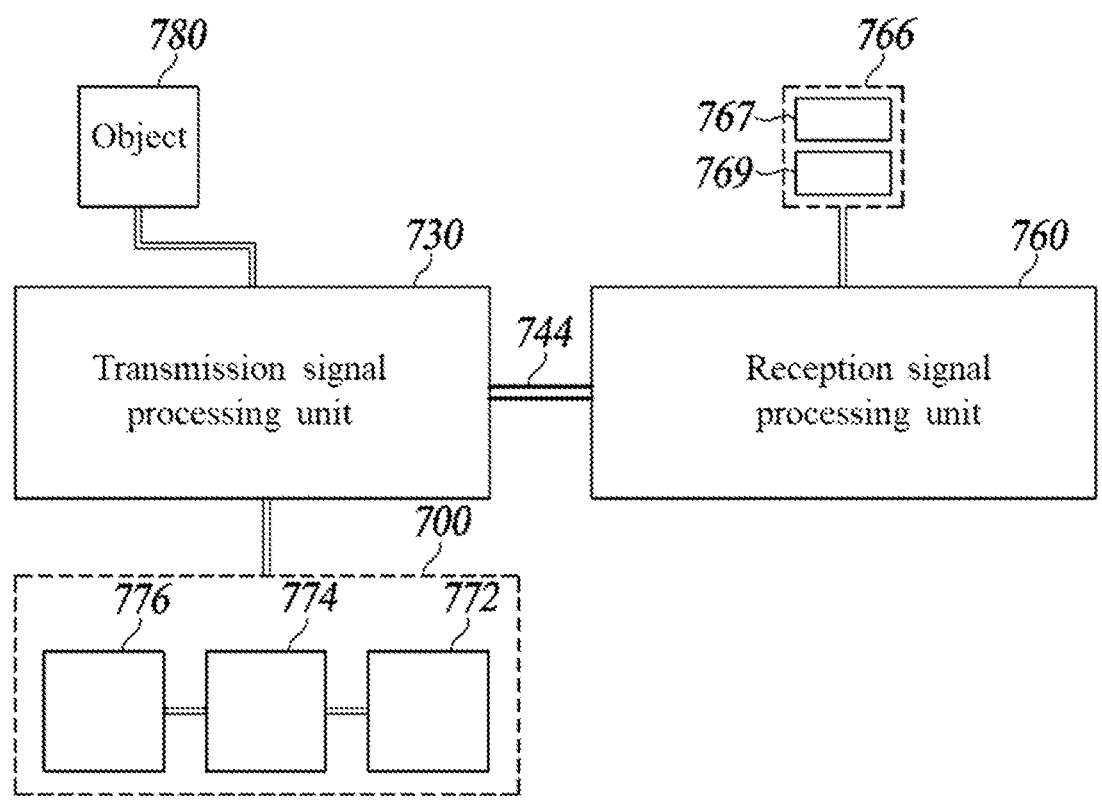
FIG. 7 is yet another illustrative diagram for describing the operation of a quantum cryptographic key distribution stabilization apparatus according to at least one embodiment of the present disclosure.

FIG. 7 is yet another illustrative diagram for describing the operation of a quantum cryptographic key distribution stabilization apparatus according to at least one embodiment of the present disclosure.

The quantum cryptographic key distribution stabilization apparatus 700 of FIG. 7 performs the same function as the quantum cryptographic key distribution stabilization apparatus 600 shown in FIG. 6. However, there is a difference that an object 780 subject to variation of effective optical path length is not included in its receiver but included in its transmitter.

Accordingly, the quantum cryptographic key distribution stabilization apparatus 700 transmits information for stabilizing the quantum cryptographic key distribution to a transmission signal processing unit 730 of the transmitter, thereby causing the transmission signal processing unit 730 to regulate the object 780 subject to variation of effective optical path length.

Figure 8:
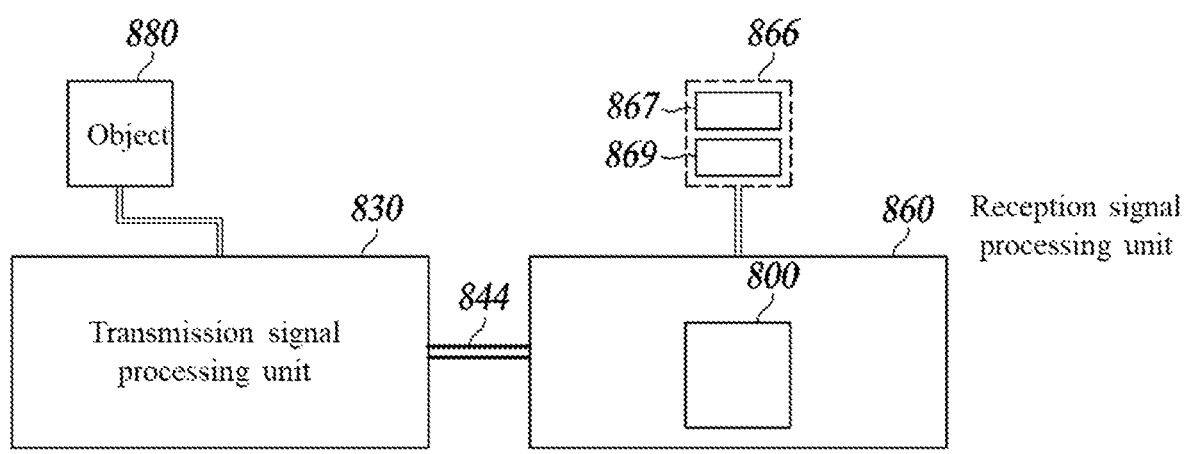
FIG. 8 is a diagram illustrating a case where a quantum cryptographic key distribution stabilization apparatus according to at least one embodiment of the present disclosure is included in a signal processing unit of a receiver.

FIG. 8 is a diagram illustrating a case where a quantum cryptographic key distribution stabilization apparatus according to at least one embodiment of the present disclosure is included in a signal processing unit of a receiver.

A quantum cryptographic key distribution stabilization apparatus 800 of FIG. 8 performs the same function as the quantum cryptographic key distribution stabilization apparatus 600 shown in FIG. 7. However, different from the quantum cryptographic key distribution stabilization apparatus 600 shown in FIG. 7, the quantum cryptographic key distribution stabilization apparatus 800 is disposed internally of the reception signal processing unit 860 of the receiver rather than externally thereof.

The quantum cryptographic key distribution stabilization apparatus 800 may control an object (not shown) subject to variation of effective optical path length included in the receiver, or it may be disposed in a transmitter as in the embodiment of FIG. 7 to control an object 880 subject to variation of effective optical path length included in the transmitter.

Figure 9:
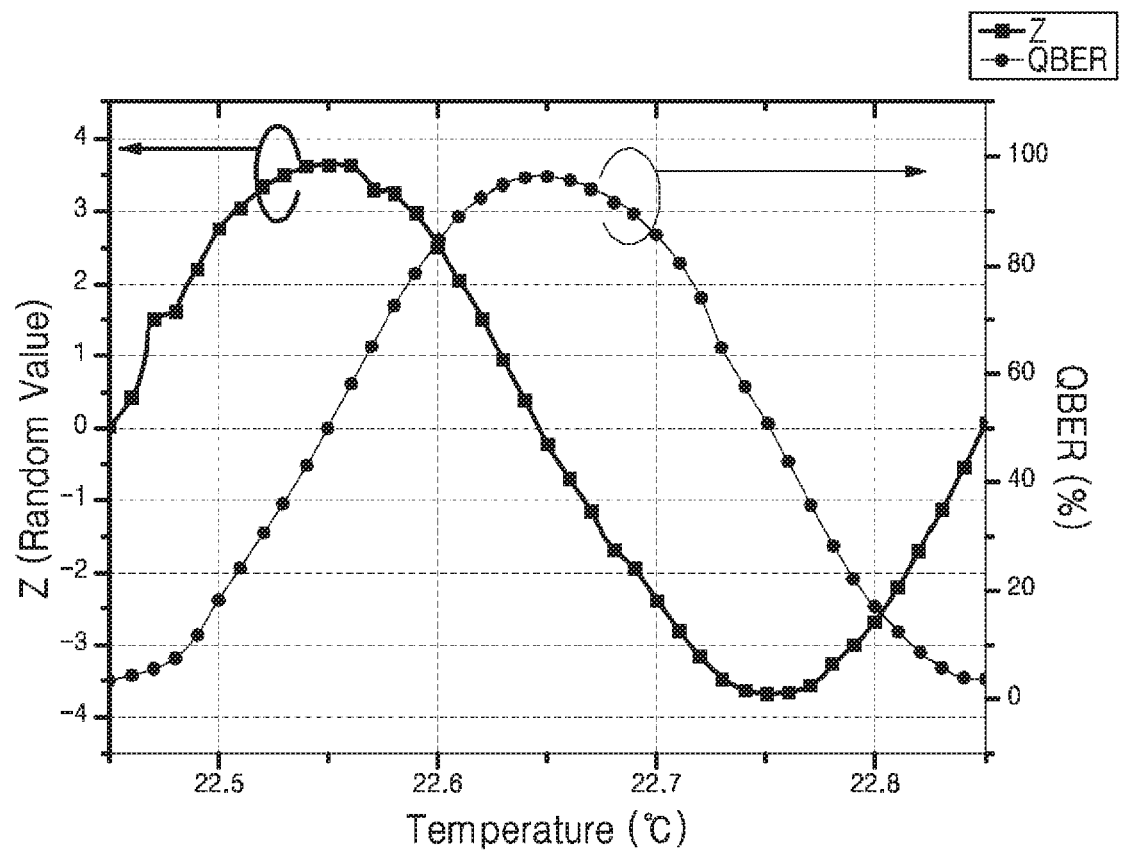
FIG. 9 is a graph illustrating a negative feedback error signal and a quantum bit error rate (QBER) value according to temperature changes, which are generated by the quantum cryptographic key distribution stabilization apparatus according to at least one embodiment of the present disclosure.

FIG. 9 is a graph illustrating a negative feedback error signal and a quantum bit error rate (QBER) value according to temperature changes, which are generated by the quantum cryptographic key distribution stabilization apparatus according to at least one embodiment of the present disclosure.

It can be seen that the negative feedback signal and the QBER value generated by the quantum cryptographic key distribution stabilization apparatus are sensitively changed according to the temperature of the interferometer. When the temperature deviates from the initial set point, the Z value, which is a negative feedback signal, deviates from zero. As the negative feedback signal Z value deviates from zero, the QBER increases.

This embodiment is applicable to use by modifying the set value of the temperature controller used to stabilize the temperature of the interferometer included in the transmitter and the receiver. In this case, the optical path control unit is the temperature controller, and the object subject to variation of effective optical path length is the interferometer included in the transmitter or the receiver.

The change in length caused by the temperature change or vibration of the interferometer changes the quantum bit error rate, which can be stabilized by controlling the temperature of the interferometer, or by changing the physical length of the optical device constituting the optical path by using a piezoelectric device or mechanical device.

FIG. 10 is a flowchart of a quantum cryptographic key distribution stabilization method according to at least one embodiment of the present disclosure.

Because the quantum cryptographic key distribution stabilization method according to at least one embodiment of the present disclosure is the same as described with the quantum cryptographic key distribution stabilization apparatus according to at least one embodiment of the present disclosure shown in FIG. 5, the description is omitted herein.

Figure 11:
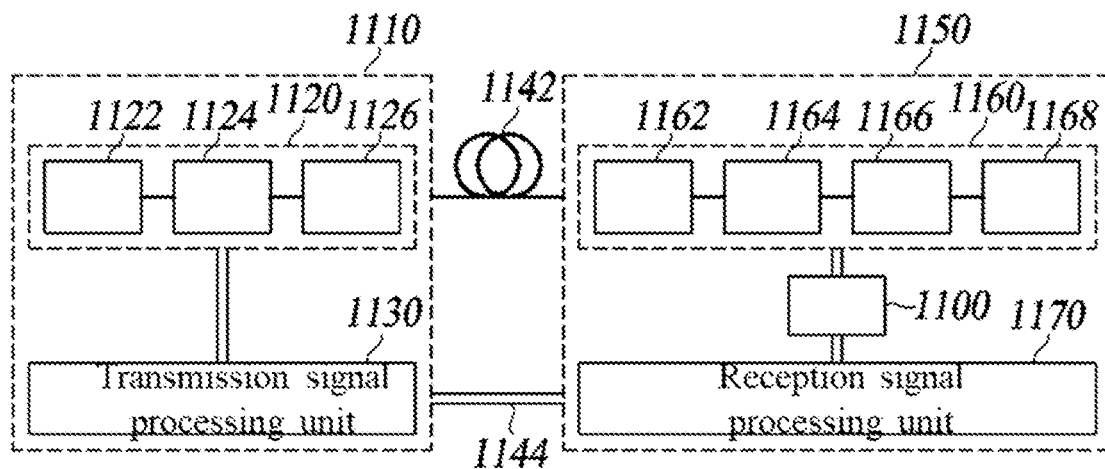
FIG. 11 is an illustrative diagram for describing the operation of a polarization modulation-based quantum cryptographic key distribution system to which a quantum cryptographic key distribution stabilization apparatus according to at least one embodiment of the present disclosure is applied.

FIG. 11 is an illustrative diagram for describing the operation of a polarization modulation-based quantum cryptographic key distribution system to which a quantum cryptographic key distribution stabilization apparatus according to at least one embodiment of the present disclosure is applied.

A quantum cryptographic key distribution stabilization apparatus 1100 according to at least one embodiment of the present disclosure illustrated in FIG. 11 performs the same function as the quantum cryptographic key distribution stabilization apparatus 600 illustrated in FIG. 6. However, a transmitter 1110 and a receiver 1150 are provided so as to perform polarization modulation rather than phase modulation, which makes a difference in both the information received for stabilization and the object to be controlled.

The quantum cryptographic key distribution stabilization apparatus 1100 according to at least one embodiment of the present disclosure is linked to a reception signal processing unit 1170 to perform data communications. Information exchanged by the quantum cryptographic key distribution stabilization apparatus 1100 with the reception signal processing unit 1170 may include count value of detections by a detection unit 1168 and information for stabilizing polarizations of the transmitter 1110 and the receiver 1150. In this case, the quantum cryptographic key distribution stabilization apparatus 1100 may be disposed in the transmitter 1110 or the receiver 1150, and may also be implemented as an independent apparatus.

The quantum cryptographic key distribution stabilization apparatus 1100 utilizes (1) detection-related values generated by the detection unit 1168 and (2) such bit information and basis information generated by the transmitter 1110 as being unmatched with the basis information generated by the receiver 1150 and received through the reception signal processing unit 1170, to generate a negative feedback signal for quantum cryptographic key distribution. The quantum cryptographic key distribution stabilization apparatus 1100 calculates a correction value based on the generated negative feedback signal and stabilizes at least the polarization state of the receiver 1150 by using a polarization adjuster.

The transmitter 1110 according to at least one embodiment of the present disclosure includes a transmission optical system 1120 and a transmission signal processing unit 1130.

The transmission optical system 1120 includes a light source 1122, a polarization bit information modulator 1124, and a polarization basis information modulator 1126. The polarization bit information modulator 1124 and the polarization basis information modulator 1126 may be integrated into a single embodiment.

The light source 1122 performs the same function for the same purpose as the light source 222 shown in FIG. 2.

The polarization bit information modulator 1124 receives optical pulses from the light source 1122 and performs bit information modulation. The polarization bit information modulator 1124 modulates the bit information by controlling the direction, that is, the angle of the polarization of the optical pulse. Here, the modulating angle is a value of a polarization beam splitter (PBS) included in the receiver 1150 with respect to a transmission axis.

The polarization basis information modulator 1126 receives optical pulses from the light source 1122 and performs basis information modulation. The polarization basis information modulator 1126 modulates the basis information by also controlling the angle of the polarization of the optical pulse. The polarization basis information modulator 1126 may modulate an unmodulated portion of the optical pulses inputted thereto, which passed unmodulated through the polarization bit information modulator 1124.

The optical pulses passing through the polarization bit information modulator 1124 and the polarization basis information modulator 1126 are transmitted to the receiver 1150 through a quantum channel 1142.

The transmission signal processing unit 1130 is linked to the receiver 1150 and the quantum cryptographic key distribution stabilization apparatus 1100 through a public channel 1144 to perform data communications. The transmission signal processing unit 1130 generates information for quantum cryptographic key distribution and stores the generated information. The information for quantum cryptographic key distribution includes bit information and basis information. The transmission signal processing unit 1130 transmits the information for quantum cryptographic key distribution to the transmission optical system 1120, and shares the information for quantum cryptographic key distribution with the quantum cryptographic key distribution stabilization apparatus 1100 and the receiver 1150.

The receiver 1150 includes a reception optical system 1160 and the reception signal processing unit 1170.

The reception optical system 1160 includes a polarization axis tracking unit 1162, a polarization basis information modulator 1164, a polarization beam splitter 1166, and the detection unit 1168. The detection unit 1168 may include at least two single-photon detectors.

The polarization axis tracking unit 1162 tracks the polarization state of the optical pulses transmitted from the transmitter 1110 through the quantum channel 1142. Optical pulses that do not coincide with the polarization axis of the polarization beam splitter 1166 of the receiver 1150 are divided into components coincident with the polarization axis and components orthogonal to the polarization axis and pass through the polarization beam splitter 1166. In addition, the polarization state of the optical pulse may be changed by various external factors generated in the process of passing through the quantum channel 1142. When the polarization state of the optical pulse is thus altered out of a complete coincidence with the polarization axis of the polarization beam splitter 1166, the detection rate of the detections by the detection unit 1168 deviates from the values of maximum 100%, minimum 0%, 50:50, etc.

The polarization basis information modulator 1164 performs polarization modulation on the optical pulse passed through the polarization axis tracking unit 1162. As the polarization basis information modulator 1164 performs polarization modulation on the optical pulse passing through the reception optical system 1160, the detected value by the detection unit 1168 is changed.

The polarization beam splitter 1166 splits optical pulses incident thereon into two different optical paths according to polarization. One of the optical pulses divided into the two different optical paths is incident on a first single-photon detector (not shown), and the other is incident on a second single-photon detector (not shown). The count values of detections due to optical pulses incident on the first single-photon detector and the second single-photon detector are similar to those described with reference to FIG. 6 and Table 1.

The polarization modulation amounts of the transmitter 1110 and the receiver 1150 in compliance with the BB84 protocol and the detections in the receiver 1150 according to changes in the polarization modulation amount may be summarized into eight occasions as shown in Table 2 below.

TABLE 2

| Transmitter Bit Information | Transmitter Basis Information | Receiver Basis Information | D1 Detection Rate (%) | D2 Detection Rate (%) | Detection Count Value Representation | Detection Count Value Increase or Decrease |
|---|---|---|---|---|---|---|
| 0° | 0° | 0° | 100 | 0 | | |
| 0° | 0° | 45° | 50 | 50 | $D1_{00}, D2_{00}$ | +, − |
| 0° | 45° | 0° | 50 | 50 | $D1_{01}, D2_{01}$ | −, + |
| 0° | 45° | −45° | 100 | 0 | | |
| 90° | 0° | 0° | 0 | 100 | | |
| 90° | 0° | −45° | 50 | 50 | $D1_{10}, D2_{10}$ | −, + |
| 90° | 45° | 0° | 50 | 50 | $D1_{11}, D2_{11}$ | +, − |
| 90° | 45° | −45° | 0 | 100 | | |

The first column and the second column respectively indicate the amount of bit information modulation and the amount of basis information modulation made by the polarization bit information modulator 1124 and the polarization basis information modulator 1126 included in the transmitter 1110, respectively. The third column shows the amount of basis information modulation by the polarization basis information modulator 1164 included in the receiver 1150. Here, the modulation amount is the angle at which the polarization of the relevant optical pulse is turned.

The fourth and fifth columns indicate single-photon detection rates in the first single-photon detector and the second single-photon detector included in the detection unit 1168, respectively. The sixth column represents the count values of detections by the first single-photon detector and the second single-photon detector by using bit information and basis information, and the last and seventh column shows the increase and decrease of the count value of detections. Here, the count value of detections is defined as being increased upon receiving a single photon whose polarization is turned in the positive (+) direction with respect to the reference axis (vertical direction) of the transmitter 1110. In other words, upon receiving a single photon with its polarization turned in the negative (−) direction, the count value of detections decreases.

The quantum cryptographic key distribution stabilization apparatus 1100 according to at least one embodiment of the present disclosure stabilizes the quantum cryptographic key distribution between the transmitter 1110 and the receiver 1150 based on the detection values discarded among the count values of single-photon detections by the receiver 1150 because of the receiver basis information of the receiver 1150 not matching the transmitter basis information of the transmitter 1110. The values resulting from where the transmitter basis information of the transmitter 1110 matches the receiver basis information of the receiver 1150 will be used for the extraction of the cryptographic key, although not shown in Table 2.

The count value of detections by each detector is expressed as $Dy_{kl}$, wherein y represents the detector number, k and l represent bit information and basis information of the transmitter 1110, respectively. Specifically, when y is 1, k is 0, and l is 1, and when bit information and transmitter basis information of the transmitter 1110 are 0 and 1, respectively, the value represents the count value of detections by the first single-photon detector. Although the receiver basis information representation of the receiver 1150 is omitted, since it does not match the transmitter basis information of the transmitter 1150, it can be inferred by confirming the value of l. For example, in the case of the count value of detections denoted by $D1_{01}$, since the bit information and the basis information of the transmitter 1110 are 0 and 1, respectively, the basis information of the receiver 1150 is zero.

The negative feedback signal generated by the quantum cryptographic key distribution stabilization apparatus 1100 to stabilize the quantum cryptographic key distribution may be obtained by applying just what is detailed from Equation 11 to Equation 15 to the first single-photon detector and the second single photon included in the detection unit 1168.

The first negative feedback signal, the second negative feedback signal, and the sum of these two signal values generated by the quantum cryptographic key distribution stabilization apparatus 1100 according to at least one embodiment as shown in FIG. 11 may be expressed by Equation 13, Equation 14 and Equation 15, respectively.

Figure 12:
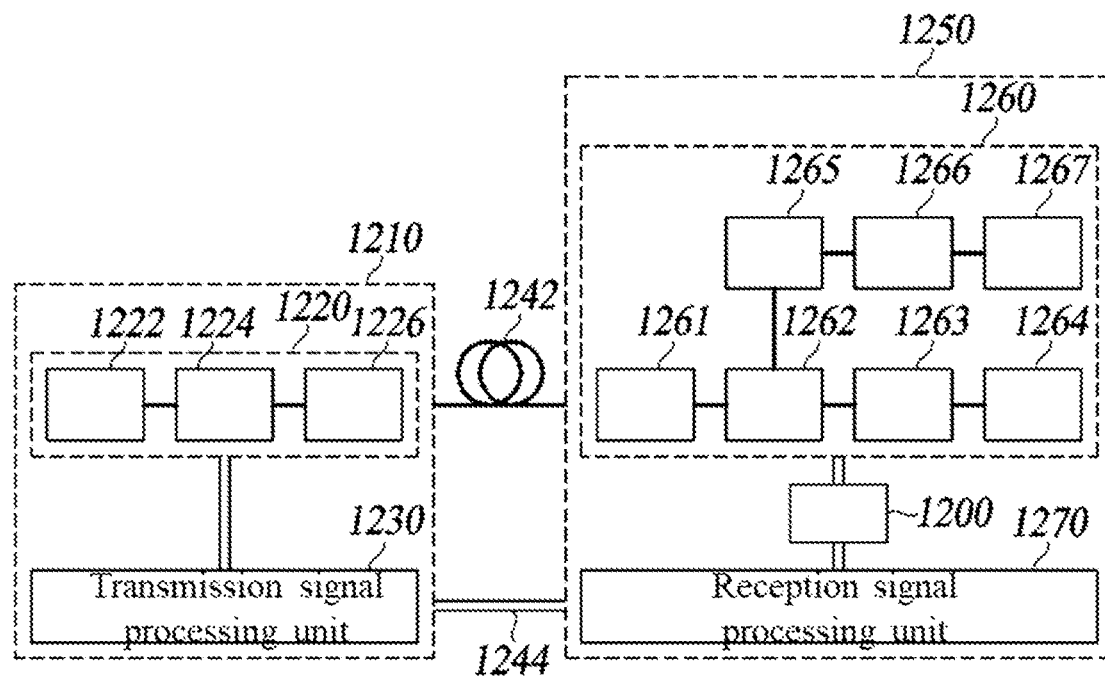
FIG. 12 is another illustrative diagram for describing the operation of a polarization modulation-based quantum cryptographic key distribution system to which a quantum cryptographic key distribution stabilization apparatus according to at least one embodiment of the present disclosure is applied.

FIG. 12 is another illustrative diagram for describing the operation of a polarization modulation-based quantum cryptographic key distribution system to which a quantum cryptographic key distribution stabilization apparatus according to at least one embodiment of the present disclosure is applied.

A quantum cryptographic key distribution stabilization apparatus 1200 according to at least one embodiment of the present disclosure illustrated in FIG. 12 performs the same function as the quantum cryptographic key distribution stabilization apparatus 1100 illustrated in FIG. 11. However, different from the quantum cryptographic key distribution stabilization apparatus 1100, a first detection unit 1264 and a second detection unit 1267 are each provided with two single-photon detectors, and thus four different single-photon detectors in total.

The quantum cryptographic key distribution stabilization apparatus 1200 according to at least one embodiment of the present disclosure is linked to a reception signal processing unit 1270 to perform data communications. Information transmitted and received by the quantum cryptographic key distribution stabilization apparatus 1200 to and from the reception signal processing unit 1270 may include the count values of detections by the first detector 1264 and the second detector 1267 and information for stabilizing polarization between the transmitter 1210 and the receiver 1250. The transmitter 1210 has the same configuration as the transmitter 1110 shown in FIG. 11.

The receiver 1250 includes a reception optical system 1260 and the reception signal processing unit 1270. The reception optical system 1260 includes a polarization axis tracking unit 1261, a beam splitter 1262, a first polarization beam splitter 1262, the first detection unit 1264, a polarization adjuster 1265, a second polarization beam splitter 1266, and the second detection unit 1267. Each of the first detector 1264 and the second detector 1267 may include at least two single-photon detectors.

The polarization axis tracking unit 1261 tracks the polarization state of the optical pulses transmitted from the transmitter 1210 through a quantum channel 1242. Optical pulses that do not coincide with the polarization axis of the first polarization beam splitter 1263 and the second polarization beam splitter 1266 of the receiver 1250 are divided into components coincident with the polarization axis and components orthogonal to the polarization axis and pass through the respective polarization beam splitters 1263 and 1266. In addition, the polarization state of the optical pulses may be changed by various external factors generated in the process of passing through the quantum channel 1242. When the polarization state of the optical pulses is thus altered out of a complete coincidence with the polarization axis of the first polarization beam splitter 1263 and the second polarization beam splitter 1266 the polarization beam splitter 1166, the count value of detections, i.e., the detection rate of the detections by the first detection unit 1264 and the second detection unit 1267 deviates from the values of maximum 100%, minimum 0%, 50:50, etc.

The beam splitter 1262 selects an output to which optical pulses incident on the beam splitter 1262 are transmitted. In other words, the optical pulse incident on the beam splitter 1262 passes through the beam splitter 1262, and then enters into one of the first polarization beam splitter 1263 and the polarization adjuster 1265.

The first polarization beam splitter 1263 and the second polarization beam splitter 1266 provide the same service as that of the polarization beam splitter shown in FIG. 11. The first polarization beam splitter 1263 splits optical pulses incident thereon into two different optical paths according to polarization. One of the optical pulses divided into two different optical paths is incident on a first single-photon detector (not shown), and the other is incident on a second single-photon detector (not shown).

The polarization adjuster 1265 fixes the polarization state of the optical pulse which is outputted from the beam splitter 1262 and is incident on the polarization adjuster 1265 so as to be rotated by 45°.

The second polarization beam splitter 1266 divides the optical pulses outputted from the polarization adjuster 1265 into the second polarization beam splitter 1266 into two different optical paths according to polarization. One of the optical pulses divided into the two different optical paths is incident on a third single-photon detector (not shown), and the other is incident on a fourth single-photon detector (not shown).

The polarization modulation amounts of the transmitter 1210 and the receiver 1250 in compliance with the BB84 protocol and the detections in the receiver 1250 according to changes in the polarization modulation amount may be summarized into eight occasions as shown in Table 3 below.

The first column and the second column respectively indicate the amount of bit information modulation and the amount of basis information modulation made by the polarization bit information modulator 1224 and the polarization basis information modulator 1226 included in the transmitter 1210, respectively. The third column is a value selected by the beam splitter 1262 included in the receiver 1250, and when 1 is selected, the optical pulse incident on the beam splitter 1262 is sent to the first polarization beam splitter 1263, and when 2 is selected, the optical pulse incident on the beam splitter 1262 is sent to the polarization adjuster 1265.

The fourth, fifth, sixth and seventh columns represent single-photon detection rates in the first single-photon detector, the second single-photon detector, the third single-photon detector, and the fourth single-photon detector, respectively.

The eighth column represents the count values of detections made by the first single-photon detector, the second single-photon detector, the third single-photon detector, and the fourth single-photon detector by using bit information and basis information. The ninth and last column shows the increase and decrease of the count values of detections. Here, the count value of detections is defined as being increased upon receiving a single photon whose polarization is turned in the positive (+) direction with respect to the reference axis (vertical direction) of the first polarization beam splitter 1263 of the receiver 1250. In other words, upon receiving a single photon with its polarization turned in the negative (−) direction, the count value of detections decreases.

The quantum cryptographic key distribution stabilization apparatus 1200 according to at least one embodiment of the present disclosure stabilizes the quantum cryptographic key distribution between the transmitter 1210 and the receiver 1250 based on the count value of detections discarded out of the single-photon detection-related values generated by the receiver 1250 because of the receiver basis information of the receiver 1250 not matching the transmitter basis information of the transmitter 1210. The values resulting from where the transmitter basis information of the transmitter 1210 matches the receiver basis information of the receiver 1250 will be used for the extraction of the cryptographic key.

The count value of detections of each detector is expressed as $Dz_{uv}$, wherein z denotes the detector number, u and v denote bit information and basis information of the transmitter 1210, respectively. Specifically, when z is 1, u is 0, and v is 1, and when bit information and basis information of the transmitter 1210 are 0 and 1, respectively, the value represents the count value of detections by the first single-photon detector. Although the basis information representation of the receiver 1250 is omitted, since it does not

TABLE 3

| Transmitter Bit Information | Transmitter Basis Information | Receiver Selected Value | D1 Detection Rate (%) | D2 Detection Rate (%) | D3 Detection Rate (%) | D4 Detection Rate (%) | Detection Count Value Representation | Detection Count Value Increase or Decrease |
|---|---|---|---|---|---|---|---|---|
| 0° | 0° | 1 | 100 | 0 | 0 | 0 | | |
| 0° | 0° | 2 | 0 | 0 | 50 | 50 | $D3_{00}$, $D4_{00}$ | +, − |
| 0° | 45° | 1 | 50 | 50 | 0 | 0 | $D1_{01}$, $D2_{01}$ | −, + |
| 0° | 45° | 2 | 0 | 0 | 100 | 0 | | |
| 90° | 0° | 1 | 0 | 100 | 0 | 0 | | |
| 90° | 0° | 2 | 0 | 0 | 50 | 50 | $D3_{10}$, $D4_{10}$ | −, + |
| 90° | 45° | 1 | 50 | 50 | 0 | 0 | $D1_{11}$, $D2_{11}$ | +, − |
| 90° | 45° | 2 | 0 | 0 | 0 | 100 | | | coincide with the basis information of the transmitter 1250, it can be inferred by confirming the value of v. For example, in the case of the count value of detections denoted by $D1_{01}$, since the bit information and the basis information of the transmitter 1210 are 0 and 1, respectively, the basis information of the receiver 1250 is zero.

The negative feedback signal generated by the quantum cryptographic key distribution stabilization apparatus 1200 to stabilize the quantum cryptographic key distribution may be obtained through the following process.

Referring to the case where the bit information is 0 in Table 3, it can be seen that $D1_{01}$, and D300 corresponding to the count values of detections made by the first single-photon detector included in the first detection unit 1264 and the third single-photon detector included in the second detection unit 1267 move in opposite directions from each other. Specifically, $D3_{00}$ moves in the direction in which the count value of detections decreases, whereas $D1_{01}$, moves in the direction in which the count value of detections increases.

Further, $D2_{01}$ and $D4_{00}$ corresponding to the count values of detections by the second single-photon detector included in the first detector 1264 and by the fourth single-photon detector included in the second detector 1267 move in opposite directions from each other. Specifically, $D2_{01}$ moves in the direction in which the count value of detections increases and $D4_{00}$ moves in the direction in which the count value of detections decreases.

Similarly, by arranging the count values of detections moving in the same direction with respect to the occasion where the bit information is 1, the following relations as in Equation 16 and Equation 17 can be obtained.

$$X=(D3_{00}-D1_{01})-(D4_{00}-D2_{01}) \quad \text{Equation 16}$$

$$Y=-\{(D3_{10}-D1_{11})-(D4_{10}-D2_{11})\} \quad \text{Equation 17}$$

Here, X is a first negative feedback signal for a value resulting from the bit information of 0, and Y is a second negative feedback signal for a value resulting from the bit information of 1.

The count values of detections by the first single-photon detector, the second single-photon detector, the third single-photon detector, and the fourth single-photon detector may differ depending on an optical loss in the quantum channel 1242, the difference in the detection efficiency by the detectors, and the like. Therefore, in order to compensate for this, the first negative feedback signal and the second negative feedback signal may be normalized.

The normalized first and second negative feedback signals are expressed by Equation 18 and Equation 19, respectively.

$$X = \frac{(D3_{00} - D1_{01})}{(D3_{00} + D1_{01})} - \frac{(D4_{00} - D2_{01})}{(D4_{00} + D2_{01})} \quad \text{Equation 18}$$

$$Y = -\left\{\frac{(D3_{10} - D1_{11})}{(D3_{10} + D1_{11})} - \frac{(D4_{10} - D2_{11})}{(D4_{10} + D2_{11})}\right\} \quad \text{Equation 19}$$

The negative feedback signal may be obtained by adding up the first negative feedback signal and the second negative feedback signal, which can be expressed as Equation 20.

$$Z=X+Y \quad \text{Equation 20}$$

The above-described negative feedback signal is calculated by digitizing count values of detections in which at least the polarization difference between the transmitter 1210 and the receiver 1250 is reflected, and the calculation is performed by the negative feedback signal generation unit of the quantum cryptographic key distribution stabilization apparatus 1200. In addition, the operation of the quantum cryptographic key distribution stabilization apparatus 1200 by the remaining components is the same as that of the quantum cryptographic key distribution stabilization apparatus 600 described with reference to FIG. 6.

Although the steps in FIG. 10 are described to be sequentially performed, they merely instantiate the technical idea of some embodiments of the present disclosure. Therefore, various modifications, additions, and substitutions are possible by changing the sequence described in FIG. 10 or by performing two or more of the steps in parallel, without departing from the gist and the nature of the embodiments of the present disclosure, and hence the steps in FIG. 10 are not limited to the illustrated chronological sequences.

The respective steps of the flowchart shown in FIG. 10 can be implemented as computer-readable codes on a computer-readable recording medium. The computer-readable recording medium includes any type of recording device on which data that can be read by a computer system are recordable. Examples of the computer-readable recording medium include a magnetic recording medium (e.g., a ROM, a floppy disk, a hard disk, etc.), an optically readable medium (e.g., a CD-ROM, a DVD, etc.), and the like, and also include one implemented in the form of a carrier wave (e.g., transmission through the Internet). Further, the computer-readable recording medium can be distributed in computer systems connected via a network, wherein computer-readable codes can be stored and executed in a distributed mode.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

INDUSTRIAL APPLICABILITY

Embodiments of the present disclosure as applied to the technical field of stabilizing the quantum cryptographic key distribution system take advantage of the conventional quantum cryptographic key distribution system unaltered to quickly and efficiently compensate for errors, which provides cost-saving system construction advantage,

What is claimed is:

1. An apparatus for quantum cryptographic key distribution stabilization, comprising a processor, wherein said processor is configured to:
   generate a negative feedback signal by using a first count value of detections that are discarded without being used for a cryptographic key generation from among photon detection-related values generated by a receiver;
   calculate a correction value for an error to be compensated for upon receiving the negative feedback signal; and
   transmit the correction value to a transmitter or a receiver and to cause the transmitter and/or the receiver to control at least one variation factor that affects an object to be stabilized, thereby stabilizing the object, and wherein the processor is configured to generate the negative feedback signal by using a second count value of detections that are discarded due to the receiver having a receiver basis information which does not match a transmitter basis information of the transmitter.

2. The apparatus of claim 1, wherein each of the transmitter and/or the receiver is configured to control an electro-optic property, a magneto-optical property, a temperature property and physical lengths that affect a phase of each of the transmitter and/or the receiver.

3. The apparatus of claim 1, wherein each of the transmitter and/or the receiver is configured to control an optical axis that affects a polarization of each of the transmitter and/or the receiver.

4. An apparatus for quantum cryptographic key distribution stabilization, comprising a processor, wherein said processor is configured to:

generate a negative feedback signal by using a first count value of detections that are discarded without being used for a cryptographic key generation from among photon detection-related values generated by a receiver;

calculate a correction value for an error to be compensated for upon receiving the negative feedback signal; and transmit the correction value to a transmitter or a receiver and to cause the transmitter and/or the receiver to control at least one variation factor that affects a phase to thereby stabilize the phase, and wherein the processor is configured to generate the negative feedback signal by using a second count value of detections that are discarded due to the receiver having a receiver basis information which does not match a transmitter basis information of the transmitter.

5. The apparatus of claim 4, wherein the processor is configured to calculate the negative feedback signal by using a third count value of detections performed respectively by at least two photon detectors of the receiver.

6. The apparatus of claim 4, wherein the processor is configured to provide a calculated negative feedback signal with a sign for allowing to indicate whether a phase deviation at either the transmitter or the receiver has a positive value or a negative value.

7. The apparatus of claim 4, wherein the processor is configured to calculate the correction value by continuously calculating a current value, a past value, and a predicted value of an error that is a difference between a set value and the negative feedback signal at predetermined time intervals.

8. The apparatus of claim 7, wherein the processor is configured
to multiply a proportional constant for obtaining the current value of the error,
to integrate the error over the predetermined time intervals for obtaining the past value of the error, and
to calculate a rate of change of the current value of the error for obtaining the predicted value of the error.

9. An apparatus for quantum cryptographic key distribution stabilization, comprising a processor, wherein said processor is configured to:

generate a negative feedback signal by using a first count value of detections that are discarded without being used for a cryptographic key generation from among photon detection-related values generated by a receiver;

calculate a correction value for an error to be compensated for upon receiving the negative feedback signal; and transmit the correction value to a transmitter or a receiver and to cause the transmitter and/or the receiver to control at least one variation factor that affects a polarization to thereby stabilize the polarization, and wherein the processor is configured to generate the negative feedback signal by using a second count value of detections that are discarded due to the receiver having a receiver basis information which does not match a transmitter basis information of the transmitter.

10. The apparatus of claim 9, wherein the processor is configured to calculate the negative feedback signal by using a third count value of detections performed respectively by at least two photon detectors of the receiver.

11. The apparatus of claim 9, wherein the processor is configured to provide a calculated negative feedback signal with a sign for allowing to indicate whether a phase deviation at either the transmitter or the receiver has a positive value or a negative value.

12. The apparatus of claim 9, wherein the processor is configured to calculate the correction value by continuously calculating a current value, a past value, and a predicted value of an error that is a difference between a set value and the negative feedback signal at predetermined time intervals.

13. The apparatus of claim 12, wherein the processor is configured
to multiply a proportional constant for obtaining the current value of the error,
to integrate the error over the predetermined time intervals for obtaining the past value of the error, and
to calculate a rate of change of the current value of the error for obtaining the predicted value of the error.

\* \* \* \* \*